(12) United States Patent
Holmes

(10) Patent No.: US 6,459,501 B1
(45) Date of Patent: Oct. 1, 2002

(54) SMALL-GAMUT COLORANT SET

(76) Inventor: Joseph Holmes, 14 Highland Blvd., Kensington, CA (US) 94707

( * ) Notice: Subject to any disclaimer, the term of this patent is extended or adjusted under 35 U.S.C. 154(b) by 0 days.

(21) Appl. No.: 09/280,232

(22) Filed: Mar. 29, 1999

Related U.S. Application Data

(60) Provisional application No. 60/080,796, filed on Apr. 6, 1998.

(51) Int. Cl.$^7$ ............................ G06F 15/00; H04N 1/46; G03F 3/08
(52) U.S. Cl. ..................... 358/1.9; 358/502; 358/518; 358/515; 358/520
(58) Field of Search .................... 358/1.9, 515, 518, 358/520, 523, 502, 501; 382/167

(56) References Cited

U.S. PATENT DOCUMENTS 5,537,228 A * 7/1996 Dillinger ............... 358/502
5,734,800 A * 3/1998 Herbert ................. 358/501
5,870,530 A * 2/1999 Balasubramanian ........ 358/501

\* cited by examiner

*Primary Examiner*—Edward Coles
*Assistant Examiner*—Monica J. Mitchell
(74) *Attorney, Agent, or Firm*—Douglas E. White

(57) ABSTRACT

A small-gamut colorant set is a new system and mechanism for reproducing monochrome images on a wide range of color printing devices with an unprecedented combination of flexibility and quality. It is fundamentally unlike, and yet in certain ways similar to, both existing colorant systems for printing color images and existing colorant systems for printing monochrome images. It combines many advantages from both of these families of traditional colorant systems into a kind of system that is superior in many ways for printing monochrome images. It uses a set of at least three tinted gray colorants to create a color space within which a small amount of chroma adjustment and the full range of hue adjustment is possible. These three tinted grays may be accompanied by a black colorant, and/or other shades of gray, or a second set of three tinted grays, depending on the opportunities presented by the nature of the printing device.

21 Claims, 5 Drawing Sheets

L*a*b Plot of Three Gamuts

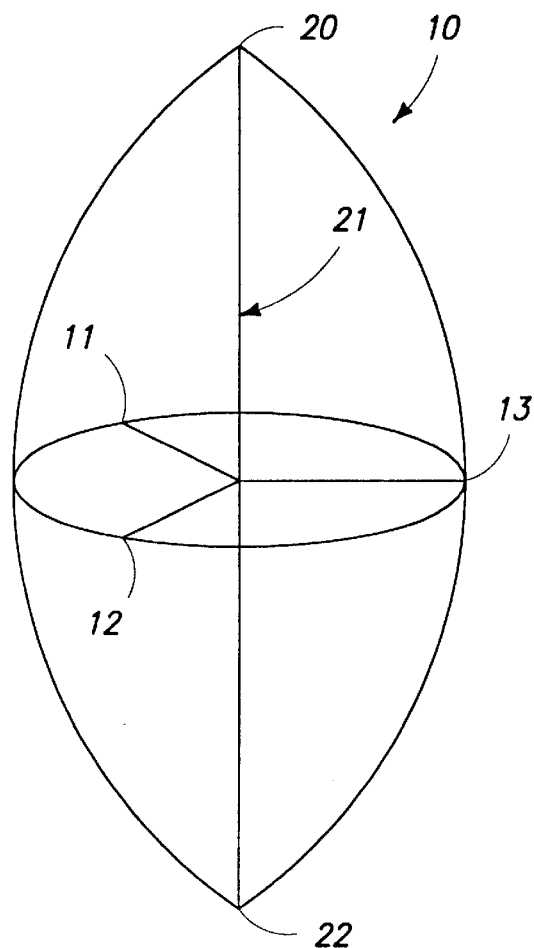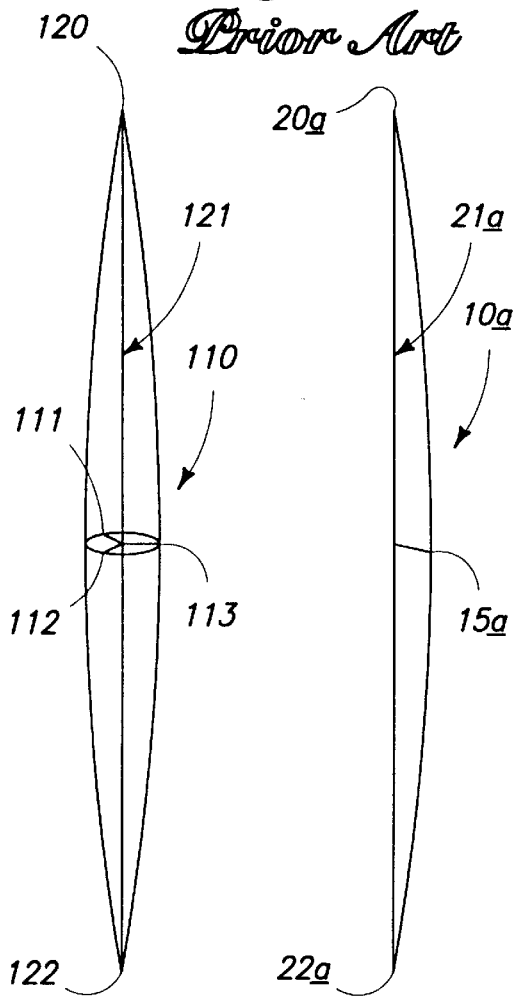

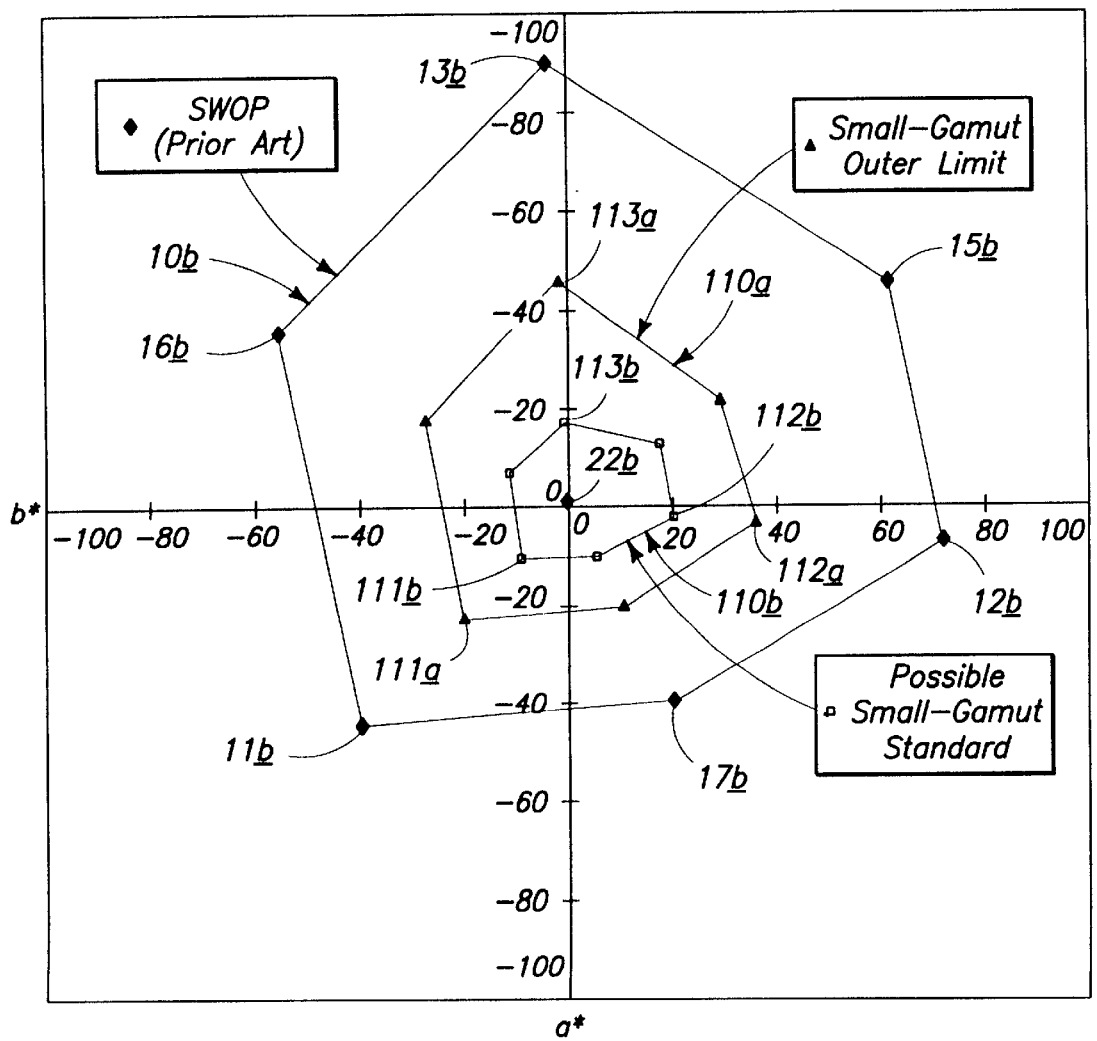

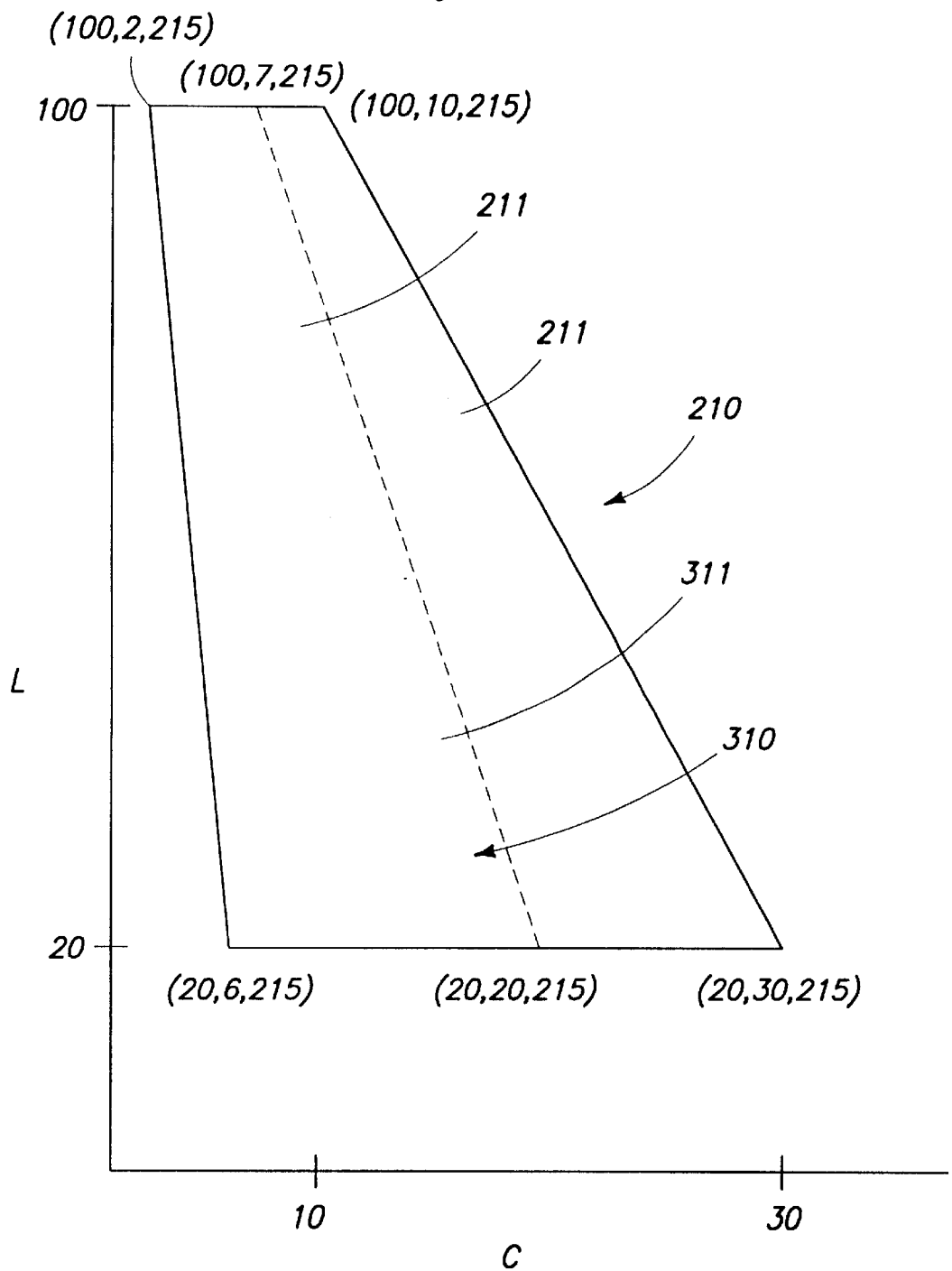

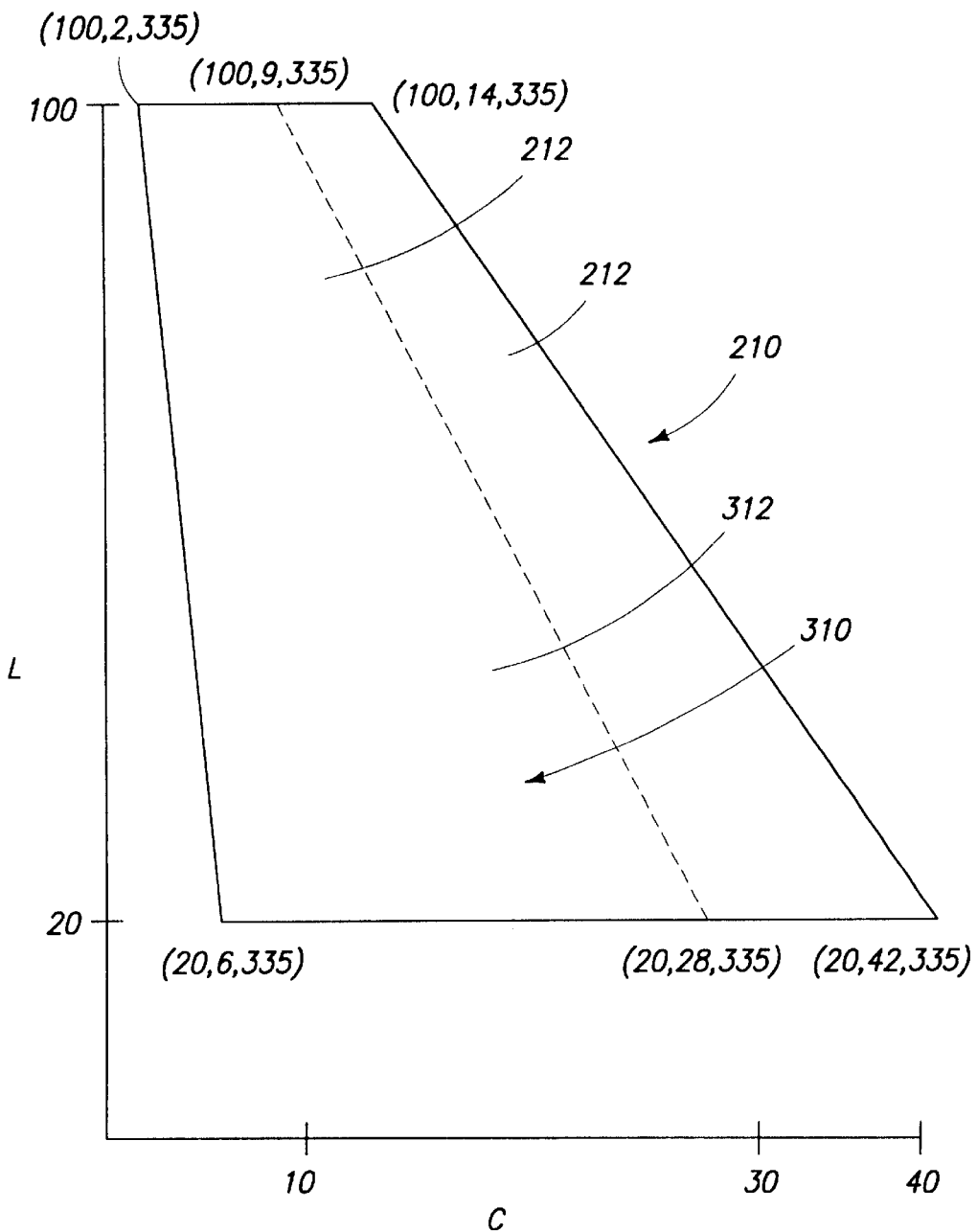

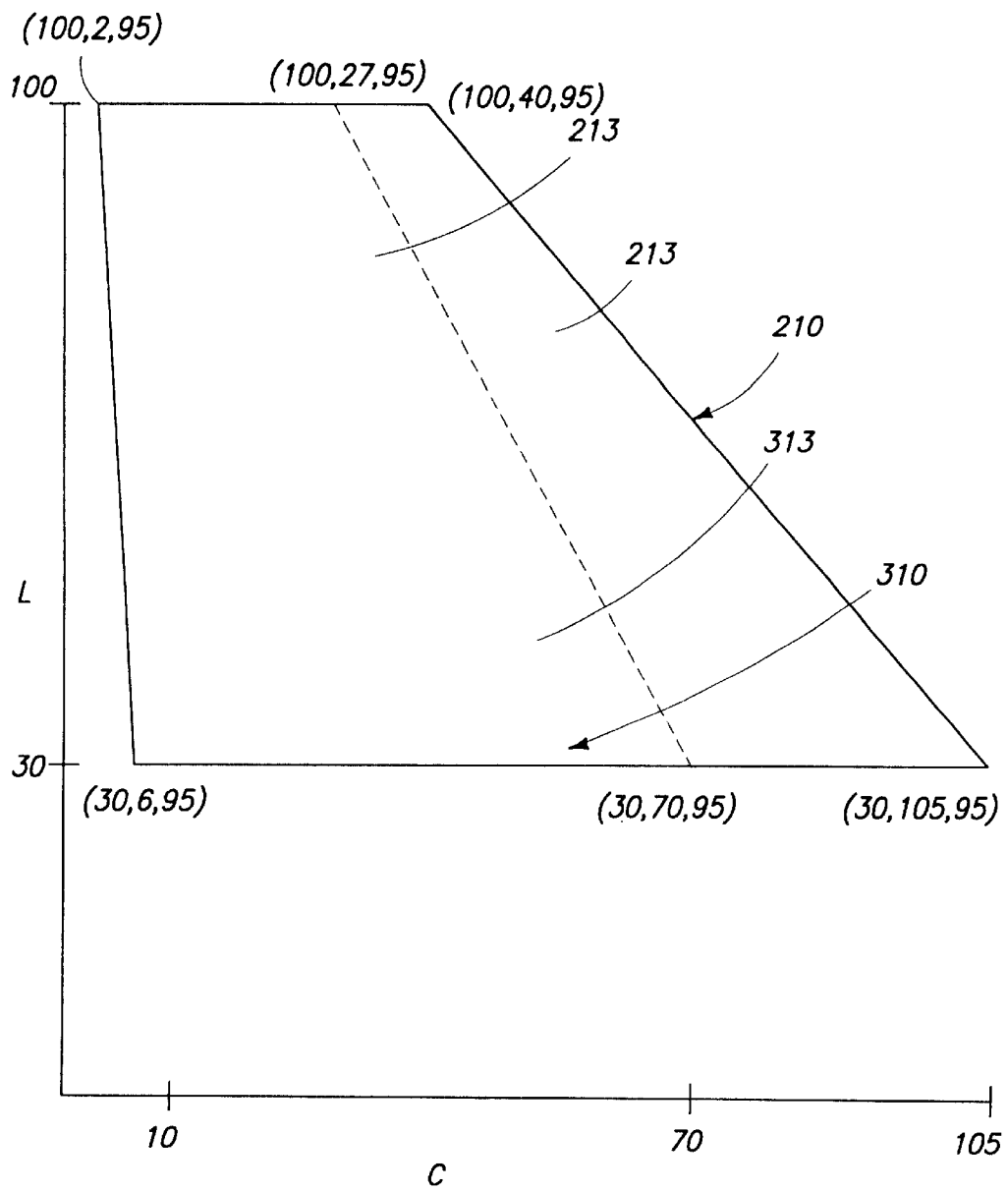

SMALL-GAMUT COLORANT SET

CROSS REFERENCE TO RELATED APPLICATIONS

This application claims the benefit of U.S. Provisional Application No. 60/080,796, filed Apr. 6, 1998.

FEDERALLY SPONSORED RESEARCH OR DEVELOPMENT

Not applicable.

FIELD OF THE INVENTION

This invention relates to the reproduction or printing of monochrome images; more particularly, to a colorant set using at least three tinted gray colorants. The colorant set may be employed as dyes, inks, toners and the like.

BACKGROUND OF THE INVENTION

I. Definitions

For clarity and consistency, the following working definitions are presented for many of the terms that are used herein:

Colorant set: a group of two, three, four, or more colorants used as a major ingredient or component of a system for creating images. Colorant sets include colorants that are described as or made from: dyes, pigments, inks, toners, etc. In some cases the terms color or ink are used herein to mean either the same thing as colorant, or a subset of the meaning of the term colorant.

Monochrome: a black and white or nearly black and white type of image or graphic. All black and white images in printed form have some color, however slight. Some color images happen to have so little color in them that they are essentially monochrome, and indeed there is a continuum of imagery in the world that spans a very wide range of overall chroma (colorfulness). However, there is a broad and obvious difference between the vast majority of images and graphics that are considered to be color images and the vast majority of images and graphics that are considered to be monochrome. In one common example, if an image originated on black and white photographic film, the image is regarded as monochrome in printed form in nearly all cases, even though all prints or other realized versions of the image actually have some color, however slight.

Gamut: the range of colors that a given printing system can print (or display), including all colors and tones from the darkest black to the whitest white.

Large-Gamut: a prior art gamut such as that of a typical device used for printing color images, including printing presses, inkjet printers, dye sublimation printers, thermal wax transfer printers, laser ablation printers, off-press proofing systems, laser/silver halide photographic printers, gelatin pigment transfer systems, color toner laser printers, and the like.

Small-Gamut: a novel gamut that falls within the bounds of this invention which is much smaller than a typical large-gamut in terms of the chroma (color saturation), but is not smaller in terms of the dynamic range (contrast between black and white)

Color Management: an automated system of processes and tools for digital imaging that perform the task of making colors look similar when moved from one device to another. Examples include making an image appear very similar on a monitor to its original appearance in a transparency or print that has been scanned, and making a digitally rendered image in printed form appear similar to the same image when viewed on a computer monitor.

C.I.E.: Acronym for the French name of the International Commission on Illumination. The C.I.E. establishes internationally-agreed upon standard mathematical models for describing all the colors that a typical human can see.

C.I.E. L*a*b*: one of the mathematical models for describing all the colors that a typical human can see. It has become an international standard, and the one that is most widely utilized in color management. It is referred to as Lab or L*a*b* in this application.

LCH: another mathematical model for describing all the colors that a typical human can see, which model is derived directly from C.I.E. L*a*b*. L (Lightness) in LCH equals L* in Lab. C (Chroma) is computed by taking the square root of the sum of the squares of a* and b* (thus by using the Pythagorean Theorem, Chroma is a measure of the distance from gray, having a* and b* values of zero, to any non-gray color coordinates in any given L* plane of Lab space). Chroma is the measure of colorfulness of a color in LCH. H is the hue angle, between 0° and 360° (360° is equal to 0°), where 0° equals a magenta-red hue, 90° is a yellow hue, 180° is a bluish green hue, 270° is a royal blue hue, etc.

Chroma: the measure of colorfulness, or saturation, of a color in the LCH color space, as defined in the previous paragraph.

Hue or Hue Angle: different hues include red, orange, yellow, green, blue-green, blue, and violet. The hue angle of a color is the value in degrees between zero and 360 that identifies the hue of a color in various color spaces including CIE L*a*b* and LCH.

ICC: the International Color Consortium is a group of companies involved in imaging, which group convenes for the purpose of creating and refining standards for the mechanisms of color management. The ICC was founded mainly in order to create a universal file architecture for device profiles used in color management. Its work has built a foundation for successful color management which uses tools from more than a single provider, and has hugely improved the outlook for color management being used successfully, since no single provider of tools ever has been able to provide all the tools necessary for more than a handful of digital imaging workflows.

Imaging: the use of a wide range of tools to create, copy, process, archive, transmit, publish, print, scan, etc., images with digital and analog systems Workflow: a chosen sequence of tools and steps for carrying out a given task. Often many different workflows are possible for a digital imaging task.

Profile: a discrete computer file containing a table or tables that relate device-specific color numbers to device-independent, i.e. absolute, color numbers (CIE color space numbers such as Lab numbers) for a given device in a given state (i.e. calibrated in a given way or printing in a given way with a given colorant set, etc.) An ICC profile is a device profile in the standard ICC format that can make it possible for color management to be performed using the profiled device.

Device-specific or device-dependent color numbers: several systems exist for specifying colors that are displayed on (in the case of a computer monitor), or seen by (in the case of a scanner or digital camera), or printed by (in the case of a printing device) a digital imaging hardware device. These systems include RGB (typically using a scale of 256 levels of color for each channel ranging from a value of zero to a value of 255), CMYK (typically using a scale of 256 levels of color for each channel ranging from a value of zero percent to 100 percent), HSV, HSL, CMYKOG, etc. All device-specific color numbers can only be thought of as producing (or showing or otherwise relating to) a particular, exact color in the context of a given device. For example, the color number (255, 0, 0), bright red in RGB space, will produce a different actual color on each RGB device, albeit a relatively bright red in each case. To accurately specify the actual color produced, it is necessary to use device-independent numbers to specify an absolute red that equals the particular red produced on or seen by any given device when the number (255, 0, 0) is displayed or printed or results when making a scan.

Device-independent color numbers: the CIE standard color models for describing color are device-independent, because they describe the appearance, under standard viewing conditions to a standard human observer, of a color in absolute terms. The device-independent color numbers cannot be fed directly to a digital color device, but they perform the vital role in color management of the universal color language. Once the device-dependent color numbers of any given device are accurately related to device-independent numbers of one of the CIE color spaces (such as Lab) in a table or tables contained in a device profile, the colors on one device can be related to the colors on any other device for which one also has an accurate profile. Device color number (a, b, c) of device A equal the absolute CIE color number equal the device color number (x, y, z) of device B.

GCR: gray component replacement describes the practice of using a relatively high proportion of black ink to create a color with a (usually) four color (CMYK) colorant system, such that some or even all of the color density that would otherwise have been created by a mixture of the three primary colorants (Cyan, Magenta and Yellow) is achieved by substituting black ink in a visually equivalent amount. Thus, neutral colors on a printed sheet can be comprised of higher percentages of black and lower amounts of the three primaries. This practice is common in offset lithography for reducing certain problems of lithography, including: instability of color balance on the press resulting from fluctuating dot gain in the three primary channels so that they do not print with the color balance that they are supposed to; waste of expensive color ink when a smaller amount of the cheaper black can substitute; set-off, onto the backs of subsequently printed sheets of paper, of ink which is built up by laying up to four or more layers of ink on the sheet; inability to achieve sufficient trapping, or adhesion, of second, third, fourth, or subsequent layers of ink on top of earlier layers of ink, thereby limiting the printing system's ability to achieve some of its target colors.

SWOP: Specifications for Web Offset Printing standards that include a standard specification for the colors of the four inks used in CMYK offset lithographic printing in the United States. SWOP inksets include virtually all of the inksets used for printing color material on printing presses in the U.S. and are highly similar in color to typical inksets of the European and Japanese standards which are often used for offset printing outside the U.S. Adherence to this standard for ink color has made it easier for off-press proofing systems to be successfully utilized, making the costs of lithography go down and the quality go up.

MATCHPRINT: the 3M or Imation brand of off-press proofing systems, which name has also come to generically refer to off-press proofing systems that include such other brands as DuPont's WATERPROOF, ENCO's PRESSMATCH, Fuji's FUJIPROOF, Kodak's CONTRACT, among others.

Red green and blue: in photography, red, green and blue are the names given to the three thirds of the visible spectrum. Blue means all the colors from 400 to 500 nanometers wavelength (the shortest wavelength third of the spectrum). Green means all the colors from 500 to 600 nanometers (the middle third of the spectrum). Red means all the colors from 600 nanometers to 700 nanometers. Thus, blue includes violet, blue, indigo, and some cyan. Green includes some cyan, green, yellow, and orange. Red includes the full range of reds, beginning with an orangey red. Yellow is a name given to many different colors, but in the three-color red-green-blue/cyan-magenta-yellow system, yellow means green plus red, i.e. the whole spectrum minus the blue third. In that system, cyan means the blue and green parts, or the whole spectrum minus the red third. And in that system magenta means the red and blue parts or the whole spectrum minus the green part.

II. Prior Systems for using Colorants

These existing systems refer to ways of using colorants, apart from the characteristics of the printing devices, to create colors. That is, this section discusses the theoretical bases for using colorants in the following systems or models:

A) CMY, also Known as RGB Systems

Systems for making color images with three colorants fall into two broad categories. The first category uses three colorants of cyan, magenta and yellow hues to absorb light of red, green and blue color, respectively. This category includes all the systems that do not radiate light, but rather reflect or transmit light, such as color prints and color film. The second category uses three sources of radiant red, green and blue light to emit those three additive primary colors. This is how a monitor works. In both cases, color images are created by modulating the amounts of red, green and blue light.

Note that all of these categories of systems (A through D) can be used for printing both color images and monochrome images.

To create black, these systems add all three colorants (or the inverse in a radiant system) together in the maximum amount available in the system. To create white, the minimum colorant is used, so that a sheet of paper may reflect as much light as possible or the film transmits as much light as possible. To create gray, the three primary colorants are mixed in a carefully balanced way to give spectrally neutral absorption of reflected or transmitted light. In a radiant device, the intensity of light emitted by the three sources of radiant light is also balanced carefully to make grays.

By modulating the amounts of the three thirds of the spectrum in the full range of ways, all the hues can be made, and the full range of lightnesses from black to white can be created. Any given digital imaging device has a gamut that is fixed and includes necessarily only a subset of all the colors that a typical person can see.

This category includes nearly all conventional photographic systems and some digital ones: color film, color printing paper and color photographic prints of nearly all types, film recorders, computer monitors and televisions, dye sublimation printers, printers that use lasers, LED's or laser diodes to print onto photographic print materials containing silver, etc.

The CMY or RGB printing systems almost always use color dyes, not pigments, to form the image, and are able to make a respectably dark black by combining only the three primary colorants.

B) CMYK Systems

These systems include printing devices only and employ similar cyan, magenta and yellow colorants to those used in many CMY systems, but add a black colorant, mainly to improve their ability to achieve a good black. The letter K is used to refer to black because the letter B might be mistakenly thought to refer to blue. Often these systems use pigments, as opposed to dyes. Pigments tend to scatter light, in addition to absorbing and reflecting light, whereas dyes do not. Sets of three additive pigment colors (cyan, magenta and yellow) therefore often do not make a good black when added together. In a CMYK set, black can also be substituted for equivalent amounts of C, M and Y in many different ways, as with GCR, mentioned above in Section I. This can save money and improves gray balance stability.

As with CMY/RGB systems, colors are made by mixing varying amounts of the colorants together. It is almost universally desirable for the gamuts of CMYK and CMY/RGB systems to be relatively large, since people would like to be able to see all the colors in a print, etc., that we can see with our eye. No set of colorants can possibly allow such a broad range of colors to be seen in a print, but many colorant sets are capable of simulating the great majority of colors that are present in most scenes that exist in the world, because most things are not extremely colorful (also referred to as highly saturated or high in chroma).

In CMYK systems, there are usually many combinations of ink that can be used to make a given actual color, because varying amounts of black can be used, with correspondingly different amounts of the three primary colors. This is not the case in CMY/RGB systems, where only one combination of colorants exists for any given color within the gamut of the system.

When choosing colorants for a system, the person or persons engineering the system must choose from actual colorants made from actual chemicals. Although the engineer ordinarily wishes to have the largest gamut possible to get the most brilliant and lifelike color from the printing system, choosing the colorants with the purest colors of cyan, magenta and yellow often results in colorants with poor resistance to fading caused by exposure to light, heat, and other things. The cost of a given colorant is also an important consideration. Many other considerations enter into the design of colorant sets for printing systems as well.

C) Systems With More Than Four Colors

Some color printing systems use more than four colorants to enlarge the gamut of printable colors or to improve the smoothness of images or graphics printed.

Some systems that employ more than four colors for offset lithography are referred to as HiFi color systems Pantone's Hexachrome standard six-color inkset system uses a CMYK set, slightly modified from the SWOP standard CMYK colors, plus an orange and a green ink to make it possible to print most hues with greater chroma on a printing press. This is a HiFi color system.

Several other HiFi color systems are in use in the world that use fixed sets of seven and sometimes eight colors in relatively fixed ways to print color images with improved gamut.

Often, spot colors are used to increase the gamut of a printing system in a particular hue. A single color may be added to CMYK to achieve, for example, better blues on press. Sometimes multiple spot colors are used. Using spot colors is not a standardized thing and requires more operator skill to achieve successfully than might be required in a more standardized system that employs extra colorants. Spot color use by itself may also be considered reason enough to refer to the system involved as a HiFi color system—although the use of spot colors predates the term HiFi color.

Basically, these systems all work similarly to the RGB/CMY and CMYK systems inasmuch as they combine the colorants in a full or fairly full range of ways to make all the colors that could be made by mixing these colors of ink together.

On relatively rare occasions, existing systems will add a gray to a standard CMYK set to improve the stability and smoothness of the tone scale when printing color images of subtle chroma. This technique can extend the usefulness of the GCR mechanism by making it possible to build a middle gray or a lighter gray from more than just black ink, or black ink plus C, M and Y, because the gray can also be used. When multiple colors of ink are blended to create a range of colors in an image, the smoothness of the image structure is generally improved because the patterns inherent in the dot structure of the image (if any) are usually disguised by the presence of multiple patterns. Also, banding due to a shortage of printable levels in any one color is disguised by using multiple colors. Printing a monochrome image with black ink alone is very limiting to the smoothness that can be attained on most printing systems.

Another method employed by systems that print with more than four colorants is to add cyan, magenta, and/or yellow colorants that are of much lower optical density (much lighter) than the main cyan, magenta, and/or yellow colorants. This makes it possible to achieve superior tonal smoothness for much the same reason that using a gray ink in addition to a single black for printing monochrome can improve the tonal smoothness of a printed image. The Epson Stylus Photo brand printer uses a typical CMYK colorant set, plus a pale cyan and a pale magenta, and the effect is of noticeably superior smoothness in tonal transitions within printed images as well as less obvious dot structure.

D) Duotone and Similar Systems for Monochrome Printing Only

The systems that have been created expressly for printing monochrome images (as opposed to existing color systems merely used for printing monochrome) include the following:

Simple black: the use of only one colorant to create all the colors of the image by varying the amount of the colorant used at any location in the image. This approach is very limiting to quality because nearly all mechanisms for printing are incapable of printing a visibly flawless, smooth gradient with only one colorant. Tone breaks are ordinarily visible that harm the appearance of a printed image. Subtle control over highlight tones may be impossible. Control over image color is essentially nonexistent—whichever hue results when the particular black is printed on the particular substrate (e.g., paper) is the hue to which you are limited. Dot patterns that are typically inherent in the nature of the printing device are maximally visible when only one colorant is used.

Duotone, or black plus one gray: The most commonly employed system for high-quality printing of monochrome images (this system is perhaps exclusively used with offset lithography) is called duotone, because it employs two colors—one black and one gray. Often the gray will have a tint, to give a pleasing hue of subtle chroma. The black will inevitably have some hue and chroma as well, although the chroma of black printing inks tends to be very slight (there is no such thing as a perfectly neutral-colored object).

A typical duotone colorant set is used so that there is a broad range of overlap in the tone scale of an image between the two colors, with the black being weighted so that it appears mainly in the darker tones and is often totally absent in the brightest tones, and the gray being weighted to favor the lighter tones, although still being likely at 100% coverage in the darkest areas. This system allows for essentially complete stability of hue and chroma on press despite the many sources of variation in dot size that exist in offset lithographic systems (other systems have their own sources of image density variation in printing).

This system also allows for relatively good maximum density (very black blacks) and has less obvious screening artifacts than when black is used alone, but still is ordinarily used at very high screen rulings (the number of rows of halftone dots per inch or per centimeter that are in each color of the image), such as 300 lines per inch, in order to provide superior image detail and to suppress screening artifacts, which are nevertheless typically visible in such printed matter.

Duotone only requires two impressions of ink, which can save money compared with four color systems being used for printing monochrome images. However, most printing presses have at least four units, so the savings can be marginal compared to printing with four colorants. Also, because no standard colorant set is used, and perhaps also because the screen rulings employed are so high, no off-press proofing product is available (except one of less than optimal accuracy) for making proofs in advance of actual printing of duotone images. This is a major handicap.

This system, and all of the other existing systems for printing monochrome only, are all highly limited in their flexibility for rendering the actual hue and chroma of images being reproduced (as, for example, original black and white photographic prints) or of images being rendered from creatively edited digital image files.

These existing systems are inflexible in any given configuration and therefore do not lend themselves to standardization, which would improve prospects for off-press proofing system development. These systems also are not color systems at all, in the sense that the CMY/RGB and CMYK systems are color systems because they contain a full range of hues and are represented mathematically as three primary color channels, sometimes with a fourth channel for black. Rather, these monochrome only systems have their own mathematical models which are not compatible with image display systems in computers and imaging software applications, or with the workings of color management systems.

These existing monochrome-only systems do lend themselves to choices of colorants that are quite resistant to both light-induced and heat-induced (dark) fading. In this area they have a large advantage over typical CMY/RGB and CMYK systems.

Tritone usually one black plus two grays (rarely employed and not done in any standardized manner): Those rare offset lithographic print jobs that utilize a third color for printing, in addition to one gray and one black, are most likely to utilize another gray. The various ways in which three such colorants are used is not standardized and is most likely to use a second gray to either further improve the tonal smoothness obtained or to create a split-toned effect, so that one part of the tone scale of an image has one slight bit of color, and another part of the tone scale has a different slight coloration. The coloration so obtained is fixed within any given trichrome system (not adjustable except in very limited ways, as by changing ink color).

Quadtone, typically two blacks and two grays (even more rarely used and not done in any standardized manner): Like tritone, those rare print jobs that are loosely referred to as quadtone are optimized on ajob-by-job basis (typically a system is put together for printing one book). These systems would most likely use two blacks and two grays in order to further improve on the delicacy of tonal transition in the shadows and to further improve on the blackness of the black.

Like the other monochrome-only systems mentioned above, quadtone does not function like a color system at all, having no real color gamut, except possibly to a meager degree between the hues of the two grays used. At any given lightness in an image, only one hue and chroma is possible with any given choice of inks and separation curves (the curves determine how much each ink will contribute to the total color at any given point in the tone scale).

"Quadtone" is capable of superb tonal smoothness and dynamic range, as well as very beautiful renderings of a range of monochrome material (such as fine art black and white photographic prints). Existing systems for using four colors of ink in the manner of quadtone systems are, however, incapable of enjoying several major benefits of the small-gamut colorant sets of this invention discussed below.

Also, quadtone colorant sets are essentially never found in any printing systems except offset lithographic systems (and other systems used with printing presses such as gravure).

One inkjet system, disclosed recently by Tektronix and another company, is designed to use one black and three grays, of similar or identical hue (orange tinted) and three different lightnesses, to simulate one kind of analog photographic artifact—x-ray films, using a four-color digital printing device (probably an inkjet printer). This system is, like existing four-colorant systems that have been rarely employed with printing presses, incapable of enjoying several of the major benefits of my small-gamut colorant set invention discussed below. Another new system for monochrome printing on IRIS inkjet printers has just been introduced by the Lyson ink company of England which uses a black and three grays of identical, neutral hue but different lightnesses, to make it possible to print monochrome images with excellent smoothness and total freedom from color variation. However, there is also with no control over image color and no ability to work in the manner of color (in terms of the imaging mathematics, display, etc. as discussed above) or with color management (i.e. it works just like duotone, et al.)

III. Existing Prior Art Devices for Using Colorants

This section lists many of the types of devices or systems of hardware that exist today for using colorants to print an image, most of which are good candidates for using the small-gamut colorant set invention proposed below. These many types of devices fall into two broad categories: printing presses and everything else. Printing presses are generally huge, expensive, super high-volume production machines for printing large numbers of pieces, whereas most of the other devices are intended for making far smaller numbers of a given printed piece, and are far smaller and less expensive. There has been a huge proliferation in the number of different technologies being used to print images from digital files in recent years. The following is a brief list.

A) Offset Lithographic and Other Systems that Utilize Printing Presses

These systems typically are used to print both images and text from digital files that are used to expose high-contrast film in laser image setters. The exposed and processed film is used to expose printing plates (one for each color), which are processed and mounted on the press. The press has multiple in-line units (each of which can print one color of ink at a given time). The ink loaded into each in-line unit is controlled so that it flows, along with a water solution, toward rollers that deliver the ink and water solutions to the surface of the printing plate, which transfers the ink to an intermediary rubber blanket, which then transfers the ink to the sheet of paper passing through the press. Several impressions occur in very rapid succession, with sheets being printed usually at between 5,000 and 35,000 sheets per hour. These systems are used to produce very high volumes of printed matter at very low cost per unit.

The most modem presses are capable of using the digital file information to directly expose plates on the press itself, saving time and money if the process works right.

Printing presses are only used to print monochrome images a small fraction of the time, but the amount of this business is still substantial (on the order of one percent to one-tenth of one percent of the huge total, I would assume).

B) Inkjet Systems

The use of droplets of ink sprayed onto a substrate, usually paper, to print images and text is under very rapid development by many companies. Some such mechanisms cost nearly $100,000 retail, yet inkjet systems have already demonstrated extremely high image quality from machines costing less than $500 retail. In the imaging industry, it is a commonly held belief that inkjet systems will become dominant as the way to make prints from photographic film or digital camera captures (image files), albeit necessarily by digital means.

Inkjet printers use a variety of techniques to form droplets, expel them from nozzles and direct them toward the paper or not. The drop size is decreasing and drop size variability is increasing, year by year, resulting in ever better image quality. Most inkjet printers can print with colorant sets that are made with either pigments or dyes, opening the door to the possibility of making color prints with much higher levels of resistance to light fading than typical, conventional photographic prints, by choosing to utilize a very lightfast set of pigments.

Being a dominant category of devices, among those systems that create images by moving colorants onto the receiving sheet, means that the inkjet systems are likely to be very important users of the small-gamut colorant systems taught below.

Most inklets use four colors of ink (CMYK). Some use six or eight.

C) Thermal Wax Laser Ablation, Laser Toner, etc.

This group includes many technologies that also move colorant onto a receiver sheet to make the print. Thermal wax transfer, laser ablation, and systems that use toner in the manner of traditional color and black and white laser printers are among the many technologies that have been devised, that fall outside of the other categories mentioned here. These are also candidates for using the small-gamut invention taught below.

D) Laser (Including Laser Diode and LED) With Silver Halide, Dye Sublimation etc.

These technologies include those that use conventional photographic print materials (and similar materials) that are exposed with light to make a print. Although the exposure is with lasers, laser diodes, LED's, or similar mechanisms, the print paper is much like, or identical to, traditional color photographic paper for making color prints from color negatives. It is therefore not capable of utilizing the present small-gamut invention in a practical way.

This group also includes the so-called dye sublimation printers that use donor ribbons which are heated in a controlled way to cause dyes to migrate onto receiver sheets. These printers also are not likely candidates for using the small-gamut colorants proposed below.

E) Pigment Transfer Systems

These systems are rare and use donor sheets to transfer emulsions containing pigments or dyes to a receiver sheet. They are very labor intensive, but are good candidates for very small volume, high cost production of fine black and white prints or off-press proofs using the small-gamut colorants proposed below.

IV. Conclusion

It therefore will be appreciated that there continues to be a need for a new and improved colorant set for monochrome printing which addresses the problems of clarity, control, consistency, effectiveness, esthetics and ease of use that are attendant in the prior art. In this respect, the present invention substantially fulfills this need.

SUMMARY OF THE INVENTION

In view of the disadvantages inherent in the known art, the general purpose of the present invention, which will be described subsequently in greater detail, is to teach a new and improved colorant set optimized for monochrome printing.

The proposed small-gamut colorant set is a new system and apparatus for reproducing monochrome images on a wide range of color printing devices with an unprecedented combination of flexibility and quality. It is fundamentally unlike, and yet in certain ways similar to, both existing colorant systems for printing color images and existing colorant systems for printing monochrome images. It combines many advantages from both of these families of traditional colorant systems into a kind of system that is superior in many ways for printing monochrome images. It uses a set of at least three tinted gray colorants to create a color space within which a small amount of chroma adjustment and the full range of hue adjustment is possible. These three tinted grays may be accompanied by a black colorant, and/or other shades of gray, depending on the opportunities presented by the nature of the printing device.

In no case of which I am aware has a colorant set ever been designed for better printing of monochrome images by virtue of selecting primary colorants for the set (cyan, magenta and yellow) that are of lower chroma than would be ordinarily used when printing color images with that system.

The gamuts of existing CMY and CMYK systems for printing, whether used to print color or monochrome images, are not nearly as small as the small-gamut colorant sets taught herein. Put another way, if a colorant set that is optimized as a small-gamut set for printing monochrome images, as taught herein, were to be used for printing color images, the results would be considered clearly unacceptable for more than 99.9% of all color images and graphics by a practitioner having ordinary skill in the art of color printed matter.

FEATURES AND ADVANTAGES

There are many advantages of the small-gamut colorant sets of this invention. In addition to those presented immediately below, others are discussed in the description of the preferred embodiments of my invention.

Because a small-gamut set of this invention is in certain fundamental ways a color system (unlike all other monochrome colorant set systems), it can enjoy many advantages of color systems including: 1) the image data can be handled as color image data and be readily displayed in software applications for image editing (one does not have to work blind—a huge advantage). In other words, the image can be displayed as an RGB or a CMYK image and the actual color of the printed image can be easily shown on a computer monitor; 2) color management can be used to handle the image data to automate and vastly improve the process of accurately mimicking colors seen on a monitor or in a scanned photographic print in digitally printed output (another huge advantage); and 3) the image data can be readily edited with tools designed for editing color images in software applications for image editing (a very major advantage under many circumstances).

The invention achieves a freedom from artifacts of color instability in printing. When a set of strongly colored inks or other colorants (i.e. any large-gamut colorant set) is used to print an image, many sources of variation in the system conspire to cause a host of kinds of variation at visually detectable levels. First, if one considers the average result from a large number of prints, that result will itself not be entirely accurate for many reasons and in many ways. Second, the evenness of the application of colorants within the two-dimensional area of any given print is not perfect. Third, printing devices are always fluctuating over time, causing each print to be different from every other print. All or nearly all of these problems, which are often painfully visible in monochrome images printed with large-gamut sets as color fringes, color shifts from one part of the tone scale to another, overall hue shifts, etc., are hugely reduced by the use of a small-gamut colorant system, proportionally to the extent of chroma reduction used in engineering the colorant set, other factors held constant.

In fact, printing monochrome images with large-gamut colorant sets, especially when used so as to have more than just black colorant in most of the image in order to preserve adequate smoothness, typically yields intolerably disturbing monochrome prints because the precision of the systems is simply insufficient to the task. It is typical to be able to detect crossovers that result in such features as greenish highlights and magenta-ish shadows (as opposed to having a single hue throughout the tone scale from black to white). The small-gamut invention solves these problems, while preserving the many benefits of color imaging systems previously mentioned.

This invention lends itself to standardization. Because a small-gamut colorant system is capable of yielding a vast range of hue and chroma effects when printing monochrome images (compared with the extremely limited capabilities of any given duotone, tritone or quadtone colorant set design), one set can be used for a wide range of very demanding jobs. This means that it can be practical to develop such supporting amenities as off-press proofing systems and highly refined ICC profiles that describe the performance of a typical printing press of a given type when using the standard system. These two things alone make using a small-gamut system far more economical than any duotone system in terms of pre-press cost, although printing with four impressions is inherently more expensive than printing with two. However, most presses have at least four units (for printing four different inks in a single pass), so utilizing these extra press units is often not very costly. The use of accurate off-press proofing systems can also save lots of money on the printing step by avoiding the necessity for making press proofs, and offers increased opportunity for the artist or other producer of the images to make adjustments to the image files to improve the printed result.

The invention's benefits of standardization do not extend solely to offset lithographic systems. To a degree the same benefits apply to other printing systems, including inkjet printing systems.

The invention enables accurate reproduction of original photographic prints. When publications are created that are intended to accurately reproduce fine art black and white photographic prints, it is customary for duotone to be used (occasionally tritone or quadtone). The result is that choices are made to select, typically, one black and one gray ink that have hues and chromas (particularly the gray) that will either look roughly like the original prints when printed onto a given type of paper, or will look a different way that the creators of this custom colorant system prefer. Neither of these approaches can systematically and accurately mimic the actual color of the original prints the way a small-gamut colorant system can. By starting with a color scan of the black and white original print and using color management, the color of the print could be mimicked using a standard large-gamut colorant set, but the results would be poor because of the difficulty of accurately maintaining very delicate colors in the image. By hugely shrinking the chroma of the primary colorants, resulting in a small-gamut system that is totally useless for printing the vast majority of all color images, the ability of the system to mimic the original colors in the photographic print is maintained, but the undesirable variability of the system is hugely reduced.

When printing black and white images, it has always been very important to the beauty of the image to print the image with good color. This color is almost invariably a very weak color, on the order of perhaps twenty to sixty times weaker than the strongest color in a color image, and yet the exact coloration of a black and white image is extremely important to its beauty. Photographers try to use printing papers that they think produce good color. Likewise they tone photographic prints with selenium and other chemicals to obtain print color that they find pleasing. Masters of offset lithography who render images with duotone ink sets try to choose the most appropriate hue of gray ink, if not also of black ink, when printing their customers' work.

Nearly all of the many factors in color imaging systems that cause color errors are naturally reduced by reducing the chroma of the colorants. In those cases, if you cut the chroma of a colorant in half, the effect of a variation in the application of that colorant upon the color of the printed piece is cut nearly in half. Similarly, if you cut the chroma by 80%, the undesirable variation is cut by nearly 80%. This amount of improvement is sufficient to so reduce the undesirable color errors when black and white photographs are printed with large-gamut (e.g. SWOP) colorant systems that the net effect is stability and freedom from color variation that for all practical purposes equals that of traditional monochrome systems such as duotone, which are naturally incapable of shifting in color. If even more precision were needed, a small-gamut set can used that has an even larger reduction in chroma, relative to a SWOP system, such as a 90% reduction, and in most cases the resulting colorant set will still be able to provide sufficient color (chroma) to print with optimal coloration.

This invention is readily implemented on existing equipment. Another huge advantage of small-gamut colorant systems stems from the fact that the vast majority of printing systems in the world today are designed from the ground up as color printing systems and have therefore the ability to put three, four, or more colorants onto the substrate (printing paper or other material), in those cases where the printers work by moving colorants onto the substrate. Typical inkjet printing systems for digital imaging use utilize four colorants: cyan, magenta, yellow, and black. This makes it very simple to utilize this existing equipment for printing superior quality monochrome by simply using the different inksets taught herein. There is no need to re-engineer the printing device. The manufacturer or other supplier of ink and/or ink cartridges need only supply the alternative inkset and/or cartridges, preferably along with a high-quality ICC device profile for the printer equipped with the new inkset, and the user can then immediately begin making high quality monochrome prints.

This invention improves the permanence of the resulting print. Printed images suffer to varying degree a susceptibility to light-induced fading and often to heat-induced fading (dark fading) as well. Some printing systems yield prints with significant staining problems as well, where the print yellows over time due to chemical processes from residual chemicals left over when the print was made. Colorants vary greatly in their resistance to light fading, and also tend to fall into two classes with regard to dark fading: they are either totally stable in the dark or they are not. Although the light and dark fading and staining properties of duotone, tritone and quadtone colorant sets can be excellent, devices other than printing presses generally have no ability to utilize these solutions. Further, those solutions have major limitations, as mentioned previously, as well as more mentioned below. Often it has been seen that when choosing colorants for an inkset for inkjet printing, for example, that if one chooses the colorants with the largest chroma, in order to achieve the best and most lifelike color appearance in prints, then the colorant fades far more quickly from exposure to light than colorants with inferior chroma. Of course, this consideration is irrelevant to the present small-gamut colorant sets, which do not require high chroma colorants.

In fact, it is overwhelmingly likely that a range of idealized small-gamut colorant sets can be engineered for many types of printers that each have very superior light fading resistance in practice, compared with large-gamut colorant sets. This is true for three reasons: 1) the required tint can be achieved by using cyan, magenta and yellow pigments or dyes that are selected expressly for their light fading stability, 2) the tinted grays will contain mostly neutral colorant (such as carbon, which is totally lightfast and is typically the principal colorant in black inks, or other relatively lightfast compounds), and 3) in the final print, only very small amounts of neutral density derived from cyan, magenta and yellow colorants will be present, compared with neutral colors printed with large-gamut systems, and without having to resort to very strong GCR, which at its strongest would leave only one or two colorants present at any given place in the image at one time, reducing smoothness, and which GCR cannot remove cyan, magenta and yellow from the darker regions of the image, where their contribution to overall density is needed to bolster the black. By using a mixture of low-chroma tinted grays, the vast majority of the colors in a monochrome image (this is not a contradiction) are made from a mixture of significant amounts of either three or four colorants, resulting in improved smoothness—a primary goal of fine monochrome printing. Because only a very small amount of magenta, cyan and yellow pigment or dye is present in the image, and because the remainder of the optical density of the image can be derived from highly lightfast black colorant (even in the tinted grays) the inherent ability of the print to shift in color due to loss of density in one of these colors over time is reduced in proportion to the absence of the color dyes, plus any improvement in their stability, less the instability of the black or other colorant(s) used to make up the tinted grays. There is also, in some cases, improvement in light fading stability simply because large amounts of magenta and yellow dye are not present together, since such combinations have sometimes been seen to cause major interactive effects that lead to light fading at a hugely increased rate.

When large-gamut colorant sets are used to print monochrome images, the result is that the image is far more susceptible to the effects of light fading that just about any other kind of print, because subtle shifts in color balance that occur as one of the colorants fades faster than the others are much more noticeable in a monochrome image than in a color image printed with the same colorant set.

Smoothness is improved by this invention. Having three or four colorants present in a printed color obscures the inability of printing devices to print an infinite number of different amounts of each color. Most printing devices have at most the ability to print 256 different levels of any given colorant (two to the eighth power equals 256, therefore eight-bit per channel color has up to 256 levels in each color channel). Some printing devices only have the ability to print two levels of color in each color channel: some or none. This kind of limitation requires that a variety of techniques be utilized to increase the illusion of continuous tone printing. A small-gamut colorant set with four colors, including black, has a considerable advantage in smoothness over a duotone system being used at the same screen ruling (number of rows of printed halftone dots per inch in a printed page from an offset lithographic press). This makes it feasible to avoid having to resort to printing at extremely high rulings such as 300 per inch to achieve acceptable freedom from printing artifacts with offset lithography.

When compared with simply using a single black printer, the advantage of a four-color small-gamut set is even greater. Many color digital printing devices either use their standard, large-gamut color colorant set or a single black for printing monochrome. Small-gamut sets work much better than either of those options in many ways. The smoothness of the small-gamut result is not better than that of the large-gamut result, but the freedom from unwanted color variations is tolerable and the smoothness is as good.

As to dynamic range, the maximum black obtainable with a typical small-gamut colorant set is probably as good as or better than that of a typical large-gamut colorant set, depending on engineering choices, because the three tinted grays of a typical set may have a disproportionate amount of neutral density, compared with the primaries of large-gamut sets.

The invention is adaptable to multiple-color devices. Printers with five, six, seven, or eight color capability (there are several on the market today) can take even more advantage of the small-gamut invention by adding extra colors such as a second black that is used differently from the first black and/or one or more neutral grays to further extend the dynamic range by increasing the blackness of the maximum black and to further smooth the tone scale for even more subtle and delicate control over tone in monochrome images.

The invention is useful in medical imaging. Medical imaging is one particularly good target market for the small-gamut invention because, increasingly, physicians are needing to see simulations of monochrome images, rather than simply looking at original x-ray film, for example. Doctors often share images that are digitally transmitted and that sometimes need to be printed to be viewed. Since the printing devices are all color printing devices, the only good way to get a printed black and white image that is extremely stable and free of the artifacts of monochrome prints made with large-gamut colorant sets and able to have any desired, subtle coloration, with no modification of the printing equipment, is to use a small-gamut colorant system of this invention.

It is therefore an object of the present invention to provide a new and improved colorant set which has all, or nearly all, of the advantages of the prior art, while simultaneously overcoming most of the disadvantages normally associated therewith.

It is another object of the present invention to provide a new and improved colorant set apparatus which may be easily and efficiently manufactured and marketed for use in a wide range of presently available printing systems without, in most cases, the need for substantial modification of said systems.

It is a further object of the present invention to provide a new and improved colorant set which is durable and produces reliable and pleasing results.

An even further object of the present invention is to provide a new and improved colorant set which is susceptible of a low cost of manufacture with regard to both materials and labor, and which accordingly is then susceptible of low prices of sale to the consuming public, thereby making my small-gamut colorant set economically available to the buying public.

Still another object of the present invention is to provide a colorant set wherein the same permits an increased ease of production of monochrome printed matter relative to the art.

Another feature is a new and improved colorant set that is suitable for mass production.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the printing art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

BRIEF DESCRIPTION OF THE DRAWING

The invention will be better understood and objects other than those set forth above will become apparent when consideration is given to the following detailed description thereof. Such description makes reference to the annexed drawing wherein:

FIG. 1 is a schematic illustration of a prior art color space or device gamut for a color printing device or system;

FIG. 1A is a schematic illustration of the range of colors available in a prior art duotone system for printing monochrome images;

FIG. 2 is a schematic illustration of a small-gamut of this invention for a monochrome printing device or system which is analogous to the color space or device gamut of FIG. 1;

FIG. 3 is a L*a*b* plot of a prior art SWOP gamut; the effective outer limit of the small-gamut colorant sets of this invention; and one preferred standard small-gamut colorant set of this invention;

FIG. 4 is a plot in LCH color space showing the boundaries of cyan tinting colorant of a first and a second embodiment of the invention;

FIG. 5 is a plot in LCH color space showing the boundaries of magenta tinting colorant of the embodiments of FIG. 4; and FIG. 6 is a plot in LCH color space showing the boundaries of yellow tinting colorant of the embodiments of FIG. 4.

DETAILED DESCRIPTION OF THE INVENTION

The small-gamut colorant set apparatuses of this invention are taught to function as colorant systems for printing monochrome images in a way that provides many of the advantages of both standard color printing (i.e. large-gamut) colorant systems and standard monochrome printing colorant systems.

As noted above, both groups of standard prior art colorant systems have serious shortcomings when used for monochrome image rendering on a wide range of printing devices. The small-gamut system and method of this invention overcomes essentially all of the problems for monochrome printing that are inherent in the existing systems and makes unprecedented quality possible in many applications when printing monochrome images and graphics.

The quality issues involved and the reasons for them have been alluded to above and are explained in detail below.

Referring to FIGS. 1 and 2, there is provided therein a simple illustration of the difference between the gamuts of a typical conventional prior art colorant system for printing color images (FIG. 1) and one preferred small-gamut colorant system of this invention for printing monochrome images (FIG. 2). On, the left, FIG. 1 shows a simplistic, generic, standard, prior art color space or device gamut 10 for a color printing device or system illustrating cyan 11, magenta 12, yellow 13, white 20, grays 21, and black 22. On the right, in FIG. 2, is a small-gamut 110 of this invention, which, for illustration, is the analog of the large-gamut 10 of FIG. 1. Shown in FIG. 2 are cyan-ish gray 111, magenta-ish gray 112, yellowish gray 113, white 120, grays 121, and black 122.

Referring to FIG. 1A, there is provided therein an illustration of the gamut 10a of a prominent conventional prior art colorant system for printing monochrome images, namely, duotone, (black plus one gray). Shown in FIG. 1A are a single gray, for example, reddish gray 15a, along with, for reference, white 20a, grays 21a, and black 22a.

The range of colors available in a duotone system includes only one color (both hue and chroma) at any given lightness, as opposed to the small range (two dimensional region) shown in FIG. 1A. In other words, an actual duotone gamut is like a one-dimensional "string" with some curvature. Tritone and quadtone gamuts could have two or three "strings," each with different hues, but only at an equal number of different lightnesses.

Four-color colorant systems are dominant over the range of devices for which the small-gamut invention is most applicable, therefore this discussion will use four-color systems as the basis for discussion. However, the points made here are generally entirely applicable to systems with three to eight or more colorants.

To the best of my knowledge, four-color colorant systems for printing images and graphics that utilize three colorants with cyan, magenta and yellow hues, have always been designed with printing color images in mind. Systems using cyan, magenta and yellow colorants are the natural and obvious choice for most color printing situations (though black is often added as well). This is because essentially all the colors that we ordinarily see in the world can be simulated well by varying the relative amounts of the three thirds of the visible spectrum, i.e. red, green and blue as defined above. Using fewer than three primary colorants works poorly and using more than three is much more complex and generally unnecessary.

Similarly, colorant systems known to me heretofore designed expressly for printing monochrome images have used some combination of black and gray colorants in ways that do not allow the system to function as a color system at all. Instead, the single black ink, or black and one gray, or black and two grays, or two blacks and two grays, or one black and three grays have always allowed only a single hue and chroma to be printed at any given lightness, because for any point on the tone scale from black to white, only a single combination of ink is available in the system. Modifying that single color (chroma and hue at a given lightness, per the LCH color space) requires that the system itself be redesigned, i.e. that different colorants be chosen to make up the colorant set. This means that these conventional monochrome systems are essentially totally inflexible in several major ways.

FIG. 3 defines an outer boundary of chroma found within the small-gamut colorant sets of this invention for monochrome printing, as opposed to existing colorant systems for printing color imagery and graphics. Included are the most useful range of gamut sizes, or gamut chroma ranges for printing monochrome images. Avoided is any gamut such as is embodied in any known existing colorant set, even though that set may not be in use for printing monochrome images, or has not been chosen for use on account of its advantages for printing monochrome images. It may well be that some gamut ranges that fall within my invention as claimed are only marginally useful for the purposes stated herein. Yet, even these are believed to be novel and may well find application in special cases.

Color images do exist that could have been printed successfully with a small-gamut colorant set such as defined by either of the two inner small gamuts 110a, 110b shown in, for example, FIG. 3. However such images are very uncommon and it is very unlikely that such images were printed with anything other than a standard color printing colorant set, because the image in question is so likely to be part of a set of images with broadly varying degrees of colorfulness and because tools such as proofing systems, inksets, and ICC device profiles for such images likely would not exist.

Most printing systems (colorant system plus mechanical system, numerical tables, etc.) are devoted to printing either color images and graphics or monochrome images and graphics, at least at any given time, and these printing systems do not generally lend themselves to ready alterations of the colorant system in use. This inflexibility is one more reason that the gulf between monochrome and color work is as real and wide as it is. The small-gamut invention is a truly major departure from all existing colorant systems known to myself.

FIG. 3 shows three gamuts in a plane of Lab space. The largest of the three is a substantially accurate plot of a typical prior art offset lithographic four-color inkset, such as a SWOP standard inkset 10b, when the four inks are printed onto coated, neutral white, premium quality paper at typical printing optical reflection densities for offset. The Status T, non-polarized, absolute (including paper color) reflection densities are: cyan about 1.42, magenta about 1.41, yellow about 1.06, and black about 1.70. The data points plotted for the cyan 11b, magenta 12b and yellow 13b solid patches (100% ink coverage on the printed sheet) actually correspond to three different L* planes, as the solid colors are of four different lightnesses. Therefore the illustration is actually a concatenation many separate planes of the Lab color space, seen in top view.

The red 15b, green 16b and blue 17b data points represent the so-called two-color solid overprints, where each combination of two of the three subtractive primary colors (cyan, magenta and yellow) are printed. Having six primary colors (black 22b is in the middle, being of extremely low chroma), the SWOP gamut is a six-sided polygon in top view. This is typical of printing colorant systems with six primary colors, whether black is utilized or not. A small-gamut colorant set of this invention also has three primary, subtractive colorants, each being a gray tinted with, typically, either cyan, magenta or yellow, and often a black. It is unlikely that there would ever be good reason to add primary colorants of other hues, the way the Pantone Hexachrome HiFi colorant system does, to a small-gamut system. Hexachrome uses a cyan, a magenta, a yellow, a green, and an orange, plus black to yield a larger gamut for offset lithography than can be obtained by printing with only the standard four colors. These extra colorants make the system more costly and more complex to use.

The middle-sized of the three gamuts in FIG. 3 is my proposed outer boundary small gamut 110a for my claim for the small-gamut patent. The exact hues illustrated in FIG. 3 (cyan-ish gray 111a, magenta-ish gray 112a and yellowish gray 113a) do not limit the claims of this invention. They are shown as being identical to the hues of the SWOP primary colorants for convenience of illustration. In other words, it would actually be better, if possible, to construct a small-gamut set from tinted grays that had more idealized cyan, magenta and yellow colors than those of typical colorant sets, which have major hue errors in the case of the cyan and the magenta. A true cyan is supposed to be half way from blue to green in hue, but a typical cyan colorant is usually about 22% of the way from that mid-point toward blue, and a true magenta is supposed to be half way from blue to red in hue, but a typical magenta is usually about 47% of the way from that mid-point toward red. One chemical class of magenta colorants is only about 34% of the way from true magenta toward red.

So, the SWOP set 10b has a yellow 13b of nearly ideal hue, but the cyan 11b is much too blue and the magenta 12b is very much too red.

Where a small-gamut set is constructed with more ideal hue angles (the three primaries actually having hues within a few degrees of an ideal cyan, magenta and yellow) the efficiency of the system is enhanced, inasmuch as the size of the gamut is maximized for any given average chroma of the three primary colorants (cyan, magenta and yellow) and the need for distortions in the mathematics used to describe colors would be somewhat reduced. Since the choice of colorants for a small-gamut set is so much easier in certain respects than the choice of colorants for a large-gamut set, it is very likely that such accurate hue angles can be a part of an optimal small-gamut set. Such optimal hue angles are, however, not shown in FIG. 3. This is a unique but minor advantage that is likely to accrue to small-gamut colorant sets of this invention.

The middle-sized gamut 110a in FIG. 3 is sized so as to have exactly half of the chroma of the SWOP colors plotted in the outer prior art gamut 10b. The lowest chroma magenta colorant that I know of in use today in any color printing system is that of the LYSON FA II inkset for printing with IRIS inkjet printers. It has a chroma which is roughly 81% of the chroma of the SWOP magenta, when printed onto a substrate of very similar color and similar ability to hold ink on the surface of the sheet. Many cyan colorants in use are similar in "dirtiness" (low in chroma) to the SWOP cyan, and I know of none that are a lot less dirty. Most yellows tend to be relatively robust, both in terms of having an approximately correct hue angle (hue) and relatively good chroma, compared with the cyan and the magenta. Without disparaging the FA II magenta in any way, it is the biggest problem colorant that I know of, in terms of the poverty of its functionality in its colorant system, not only because its chroma is poor, but because its hue error is also about as serious as such colorant hue errors get. The result is that this inkset is widely discouraged for color printing that demands good rendition of either blues or reds, especially when the substrate being used is a watercolor paper. Such papers, often used for fine art printing with inkjet printers, greatly reduce the gamut of whatever colorant set is used with them, compared to less absorptive, smooth coated papers of neutral color, as for example by about 20%. My outer boundary small gamut 110a definition for this small-gamut invention is based on a standard type of substrate that yields a relatively large gamut with any given colorant set and therefore the reduced gamuts that occur with any inkset when it is printed onto certain substrates are not relevant to the definition of this outer boundary.

One of the cleanest magentas that I know of (the ones with the highest chroma) is the ID magenta, from the IRIS ID inkset. It has a chroma which is about 110% of the SWOP magenta, when printed on a substrate of equivalent character. These figures (from 81% to 110%) for the chroma of the worst and best magentas that I am aware of serve well to illustrate the range that exists in conventional, three- and four-color colorant sets for color printing.

The innermost small gamut 110b plotted in FIG. 3 shows one preferred configuration for a standardized small-gamut colorant set. Illustrated therein are cyan-ish gray 111b, magenta-ish gray 112b and yellowish gray 113b. I believe that this gamut is on the large side for preferred use as a standard gamut for monochrome printing with a range of systems, especially offset lithography. Offset lithography lends itself to standardization of colorant sets because of the major financial savings afforded by off-press proofing systems, which generally must be based on standardized colorant sets.

Note that each of the six primary colors (e.g., for the SWOP 10b: red 15b, green 16b, blue 17b, cyan 11b, magenta 12b, and yellow 13b) of the three gamuts 10b, 110a and 110b shown is plotted at a chroma that results from the colorant being printed at a particular density (typical lithographic ink densities were used, as mentioned previously). Any given colorant will shift in chroma, and to a degree in hue, as well as in lightness, as more or less of it is printed onto the substrate. These plotted points are near but not at the maximum chroma possible with these colorants. The maximum possible chromas are, I believe, roughly several percent higher than the chromas that appear here.

The one preferred standard small-gamut set 110b as shown in FIG. 3 (the innermost gamut) has a relatively wide range of possible chromas (wide for monochrome printing). The colorant set thus described is, if anything, probably then on the large side for an ideal small-gamut set. The process of designing an ideal preferred small-gamut set for a given printing system must consider many factors and balance some competing goals, but I am confident that the small-gamut approach to colorant set engineering yields superior results to all other systems for monochrome printing in nearly every way. For example, a small-gamut set must be capable of printing with enough chroma in all parts of the tone scale to achieve the intended color. It is also desirable, for the sake of maintaining optimal smoothness, to be sure that in any given printed color that at least two colors of ink are present in a substantial degree if not three or four. This argues for a gamut that is larger than it might otherwise be. Also, the color of the substrate, if any, can add to the need for chroma in the small-gamut colorant set.

It is because monochrome images very often have noticeable chroma that systems for printing monochrome images must have some significant ability to show chroma of the correct hue.

Proposed herein are two main preferred embodiments of the invention, which are identical in every way, except that the outer chroma boundary of the three tinting colorants has been moved in for the second embodiment, so that instead of being roughly equivalent to one half of the SWOP ink set, it is at about one third of SWOP in colorfulness (chroma, or strength of color, or saturation). The second embodiment is currently preferred, but the first broader embodiment encompasses a wider variety of potential applications.

Note that in the technical description of the preferred embodiments which follows, the phrase "tinting colorant" is used in place of "tinted gray colorant", due to the fact that the lightest possible of such colorants would not properly be called gray. Also, reference is made to L values, instead of $L^*$, which is thought to be correct form when referring to LCH, as opposed to $L^*a^*b^*$, despite the fact that L in LCH is mathematically identical to $L^*$ in $L^*a^*b^*$.

All LCH values refer to measurement of dry, printed colorant solids at the maximum printing density actually used in the printer/colorant/substrate system (no screened tints) including the color of the paper and are to be measured without polarization. The LCH color space is a direct mathematical variant of the CIE $L^*a^*b^*$ color space.

It is not practical to show in the drawing the colorant sets themselves as claimed, comprising as they do colors which not only are selected from ranges, but whose results vary depending on the type of paper on which they are printed. Defining characteristics can be shown on graphs, and such graphs are included in FIGS. 4–6 for the two principal embodiments—the remaining embodiments sharing the characteristics graphed therein. Turning to FIGS. 4–6, a first embodiment of the invention comprises a small gamut colorant set 210 for printing mechanisms that are capable of printing from digital data. It includes at least three colorants, namely, a first tinting colorant 211, a second tinting colorant 212, and a third tinting colorant 213. Each tinting colorant has a hue angle in LCH color space which is at least 60° different from each of the other two.

The first tinting colorant 211, called the cyan tinter, has a possible range of hue angles between 165° and 265° (i.e., a 100° range) and a possible range of L values between 20 and 100. The C values range between 6 and 30 at an L value of 20, and they range between 2 and 10 at an L value of 100. The range limits of C values are proportional to these two extremes for L values between 20 and 100 (see FIG. 4).

The second tinting colorant 212, called the magenta tinter, has a possible range of hue angles between 285° and 25° (a 100° range) and a possible range of L values between 20 and 100. The C values range between 6 and 42 at an L value of 20, and between 2 and 14 at an L value of 100. The range of C values are proportional for L values between 20 and 100 (see FIG. 5).

The third tinting colorant 213, called the yellow tinter, has a possible range of hue angles between 45° and 145° (a 100° range) and a possible range of L values between 30 and 100. The C values range between 6 and 105 at an L value of 30, and between 2 and 40 at an L value of 100. The range of C values are proportional for L values between 30 and 100 (see FIG. 6).

This embodiment, colorant set 210, is further limited by the following proviso: for such colorant sets that have only three tinting colorants, the greatest difference in L value between any of the tinting colorants is not more than 50, unless the yellow tinting colorant does not have the highest L value, in which case the greatest difference in L value between any of the tinting colorants is not more than 30.

FIGS. 4–6 further illustrate a second embodiment of this invention, colorant set 310, comprising a smaller chroma limit when compared to the broader first embodiment. A second small gamut colorant set 310 for printing mechanisms capable of printing from digital data includes at least three colorants, namely, a first tinting colorant 311, a second tinting colorant 312, and a third tinting colorant 313. Each tinting colorant has a hue angle in LCH color space which is at least 60° different from each of the other two.

The first tinting colorant of the second embodiment, called the cyan tinter 311, having a possible range of hue angles between 165° and 265° (a 100° range) and a possible range of L values between 20 and 100. The C values range between 6 and 20 at an L value of 20, and they range between 2 and 7 at an L value of 100. The range limits of C values are proportional to these two extremes for L values between 20 and 100 (see FIG. 4).

The second tinting colorant of the second embodiment, called the magenta tinter 312, has a possible range of hue angles between 285° and 25° (a 100° range) and a possible range of L values between 20 and 100. The C values range between 6 and 28 at an L value of 20, and between 2 and 9 at an L value of 100. The range of C values are proportional for L values between 20 and 100 (see FIG. 5).

The third tinting colorant of the second embodiment, called the yellow tinter 313, has a possible range of hue angles between 45° and 145° (a 100° range) and a possible range of L values between 30 and 100. The C values range between 6 and 70 at an L value of 30, and between 2 and 27 at an L value of 100. The range of C values are proportional for L values between 30 and 100 (see FIG. 6).

The second embodiment, colorant set 310, is further limited by the following proviso: for such colorant sets that have only three tinting colorants, that the greatest difference in L value between any of the tinting colorants is not more than 50, unless the yellow tinting colorant does not have the highest L value, in which case the greatest difference in L value between any of the tinting colorants is not more than 30.

The following are descriptions of ways in which either of the principal embodiments may be further limited. For example, a small gamut colorant set for printing mechanisms capable of printing from digital data includes three tinting colorants as specified for either embodiment above plus a fourth, black colorant having a possible range of L values between 0 and 30 with a range of chromas between 0 and 30, and any hue angle.

Another example is a small gamut colorant set for printing mechanisms capable of printing from digital data that includes two sets of three tinting colorants each, as specified for either embodiment above, plus a seventh, black colorant having a possible range of L values between 0 and 30 with a range of chromas between 0 and 30, and any hue angle. The average L value of the two sets of tinting colorants differ from one another by at least 30 in the L scale. The difference in L value between the cyan, magenta and yellow tinters, respectively, is at least 20 (lighter cyan minus darker cyan equals at least 30, etc.). The two sets of tinting colorants are used in the system to predominate in different regions of the L scale, thus yielding potentially superior image smoothness.

By adding a second set of three tinting colorants, each set including a cyan, a magenta, and a yellow, to, for example, either a colorant set with only one set of three tinting colorants or to a colorant set with one set of three tinting colorants plus a black, and by making one set lighter than the other, one achieves superior tonal smoothness while retaining the ability to print with a full range of possible hues and some chroma, at most L values.

Yet another small gamut colorant set for printing mechanisms capable of printing from digital data includes three tinting colorants as specified in either of the two embodiments above. A fourth, black colorant has a possible range of L values between 0 and 30. Chromas range between 0 and 50 at an L value of 0. Chromas range between 0 and 10 at an L value of 30, but in no case have a chroma value higher than any of the tinting colorants when printed to any same L value as any of the tinting colorants, and any hue angle. Further included is a fifth, gray colorant having a possible range of L values between 20 and 90 and a range of chromas for each L value that is between 0 and the lowest chroma of any of the tinting colorants printed to the same L value, including by printing at less than solid coverage or less than maximum density or both.

By adding one gray colorant to a four-color system with three tinting colorants and one black, superior gray-scale smoothness can be obtained, while still enjoying the ability to print with a range of hues and chromas at most L values.

Yet another variation of the first and second embodiments is a small gamut colorant set for printing mechanisms capable of printing from digital data which includes three tinting colorants as specified for the first or second embodiments. Further included is a fourth, black colorant having a possible range of L values between 0 and 30 with a range of chromas between 0 and 30, and any hue angle. A fifth, gray colorant has a possible range of L values between 20 and 90 and a range of chromas for each L value that is between 0 and the lowest chroma of any of the tinting colorants printed to the same L value, including by printing at less than solid coverage or less than maximum density or both A sixth, gray colorant has a possible range of L values between 40 and 96 and a range of chroma for each L value that is between 0 and the lowest chroma of any of the tinting colorants printed to the same L value, including by printing at less than the solid coverage or less than the maximum density or both. The sixth, gray colorant differs in L value from the fifth, gray colorant by at least 20.

By adding two gray colorants to a four-color system with three tinting colorants and one black, superior gray-scale smoothness can be obtained, while still enjoying the ability to print with a range of hues and chromas at most L values.

It can be seen that FIGS. 4–6 illustrate the relationship between the maximum chroma and lightness for each tinting colorant. The rule is linear, with the limit moving progressively and proportionally inward with increasing L value.

To show how small-gamut colorant sets are differentiated from existing monochrome colorant sets, it is only necessary to utilize two or three tests. First, the small-gamut set must have sufficient differentiation between the solid colors of the three or more tinted grays for the difference between each solid gray and a dead-neutral gray of the same lightness to be visible to a standard observer (typical human with "normal" color vision as defined by the C.I.E.) under the D50 or D65, 2° or 10° standard viewing conditions. Second, the three grays must work as a color system, having roughly cyan, magenta and yellow hues, or work as a system that has more than three primary colors, having then four or more hues for a corresponding number of tinted grays, that when plotted in Lab space as in FIG. 3 define a gamut that entirely surrounds neutral gray. It is preferred that the lightnesses of the three or more grays be similar, but this is not necessary. Thirdly, these three or more tinted grays are not working primarily as a series of grays of different lightnesses intended to each dominate the image in different regions of the tone scale from black to white in order to obtain improved tonal smoothness, rather they are functioning in the system as a group that together make it possible to systematically vary the hue and chroma of the image over a small but visually detectable range (detectable in at least some levels of lightness), that nevertheless includes all the hues (when printing onto neutral-colored substrates) at most levels of lightness, while simultaneously hopefully providing as much tonal smoothness benefit as possible. The minimum range of chromas claimed is thus roughly twice the minimum chroma difference detectable to a standard observer. A typical small-gamut colorant set has a total range of chroma a few to many times larger than that minimum chroma difference (radius). The chroma difference between the grays defines the shape and width of the color gamut of the small-gamut systems. This gamut, as illustrated in FIG. 2, narrows toward both black and white, as all gamuts do. The narrower regions of the gamut include some lightnesses at which the standard observer would be unable to distinguish between the range of grays printed by the small-gamut system. The small-gamut system can also include extra grays intended primarily to improve smoothness, rather than intended primarily to provide color gamut. Such grays likely are very different in lightness from some or all of the set of grays used for the purpose of giving a color gamut to the system.

Use and Operation

I. Use Of The Small-Gamut Method And Process For Monochrome Output From Color Digital Printing Systems.

Start with any kind of printer that can make color prints from digital files, excluding those that only print to conventional photographic materials. This includes many hundreds of devices that rely on a wide range of methods for moving colorants to what will become the print, including ink jet, electrostatic, thermal wax, et cetera.

Substitute a small-gamut colorant set designed for optimal performance with the printer in question. Use a minimum of three colors of gray in the set, but usually three grays plus a black, as described elsewhere. If the machine requires more than four colors to run, a small-gamut set with extra colors can be formulated. Small-gamut colorant sets with six or seven colors are capable of even better smoothness, since paler and/or darker grays can be used in lighter or darker areas of the image in place of the tinted grays of a four-color small-gamut set, and because six or seven sets of dots can create a smoother image than four at any given resolution and range of dot sizes and densities. A seven-color small-gamut set can contain light and dark magenta-ish gray, light and dark cyan-ish gray, and either light and dark yellowish gray plus black or dark yellowish gray plus light neutral gray and black.

Use no special hardware for converting the color printer into an advanced monochrome printer. Spend nothing to develop, market, or purchase special, dedicated monochrome hardware.

Utilize ICC format device profiles to enable the use of color management for efficient and high quality use of color printers for monochrome images.

Enjoy the full facility of color editing tools in image editing applications for editing the tone and subtle color of monochrome images on a computer with instant, accurate visual and numerical feedback on the monitor.

Enjoy the capability to proof monochrome images to be printed on one device with another printing device.

Virtually eliminate the many ugly color defects that make nearly all monochrome prints made with color printers substantially defective, without having to resort to printing almost exclusively with the black colorant only.

Retain the ability to print monochrome with a full range of subtle coloration, unlike using the black colorant only.

Virtually eliminate the instability in printing systems that leads to variation in the color of prints made at different times, with different printers of the same type, and in different parts of images printed on any given printer.

Achieve dramatically superior light fading performance in monochrome prints, compared with monochrome prints made with standard four-color sets for two reasons: 1) the colorants chosen can be much more stable, and 2) the amount of colorant other than neutral black or gray present in a print will be so small that some fading of it will have very little effect. Black colorants can often be made primarily with carbon as the coloring agent and carbon is totally stable on display (not subject to light fading).

Save money on colorants that are less costly to produce than standard, full-color colorants, other factors held constant.

Achieve excellent Dmax in small-gamut prints made with conventional color printers-far better than with black ink alone and possibly better than with a standard (large-gamut) four-color set.

II. Use Of The Small-Gamut Method And Process For Monochrome Lithography Compared With Use Of Conventional Methods For Monochrome, Including Duotone, Tritone, And Quadtone.

Start with any conventional or digital (direct to plate or direct to sheet) duotone, tritone, or quadtone lithographic system, which includes mainly two- and four-color printing presses and their supporting systems (imagesetting, plating, etc.)

Substitute a small-gamut ink set on the press to do superior monochrome printing.

Use mainly standard equipment and other processes for printing with the small-gamut method.

Use standardized inkset formulations to obtain more predictable and proofable color.

ICC device profiles can be made for presses using the small-gamut method, enabling accurate simulation of the printed sheet with soft proofing (on a monitor), digital proofing (on a digital printer of any kind), and with film-based proofs (such as MatchPrint, WaterProof, AgfaProof, etc.)—as soon as someone makes the necessary 3-hue gray donor sheets for film-based proofing. Traditional printing systems for monochrome (duotone, tritone and quadtone) cannot be profiled for color management, so none of the digital proofing methods can readily be used or used well with such printing, and film-based (optical) proofing systems usually can't be used with duotone, et al., partly because the dot gains involved with typical 300 lines per inch duotone are too great for optical proofing systems designed for color work to simulate and because the proofing systems do not supply the correct color donors (especially the gray or grays).

Obtain superior image smoothness compared with conventional duotone monochrome printing. The overlapping of four sets of dots at screen rulings as low as 175 lines can produce smoother gradients than the overlapping of black and gray at 300 lines.

Retain near total freedom from many types of unwanted color artifacts that are major reasons for using duotone instead of using standard four-color for monochrome.

Unlike duotone, et al., retain the ability to replicate the precise, subtle coloration of original black and white imagery, partially through the use of color management and partly through the availability of an entire color space, instead of a much smaller color region (see FIGS. 1A and 3).

Retain the ability to print near-monochrome images with the full range of coloration possibilities, such as local color, color as a function of tone scale, full range of hues, etc., all in a restricted chroma environment. The image file can be treated as a color file in image editing software, unlike a duotone file. Editing tools are better, soft proofs and other types of screen displays work better, and more complex things can be accomplished, without sacrificing much of the precise stability of hue and chroma found in duotone, tritone, and quadtone.

Enjoy the freedom to use a single small-gamut ink set for all monochrome jobs instead of having to use a wide range of non-standard inks to achieve a range of effects.

III. Use Of The Small-Gamut Method And Process For Monochrome Lithography Compared With Using The Conventional, Large-Gamut Method.

Start with any conventional or digital (direct to plate or direct to sheet) CMYK lithographic system, which includes most printing presses and their supporting systems (imagesetting, plating, etc.)

Substitute small-gamut ink set on press to do superior monochrome printing.

Use only standard equipment and other processes for printing with the small-gamut method.

ICC device profiles can be made for presses using the small-gamut method, enabling accurate simulation of the printed sheet with soft proofing (on a monitor), digital proofing (on a digital printer of any kind), and with film-based proofs (such as MatchPrint, WaterProof, AgfaProof, etc.)—as soon as someone makes the necessary 3-hue gray donor sheets for film-based proofing.

Obtain superior image smoothness compared with conventional duotone monochrome printing, and get superior freedom from registration errors compared with conventional four-color used for printing monochrome.

Achieve near total freedom from many types of unwanted color artifacts that plague conventional four-color systems (lithographic and otherwise) when they are used for monochrome printing.

Retain the ability to replicate the precise, subtle coloration of original black and white imagery.

Retain the ability to print near-monochrome images with the full range of coloration possibilities, such as local color, color as a function of tone scale, full range of hues, etc., all in a restricted chroma environment.

Achieve dramatically superior light fading performance in press prints, compared with four-color renderings of monochrome images.

Save money on ink, compared with standard (full gamut) four-color printing.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, color models, functions, operational features or the like.

Therefore, the above description and illustrations should not be construed as limiting the scope of the invention, which is defined by the appended claims.

What is claimed is:

1. A small-gamut colorant set apparatus for printing mechanisms that are capable of printing from digital data, including:
   at least three tinting colorants having hue angles in LCH color space, namely,
      a first tinting colorant,
      a second tinting colorant, and
      a third tinting colorant;
   a first lower extreme L value of 20;
   a second lower extreme L value of 30;
   an upper extreme L value of 100;
   each of said first, second and third tinting colorants having a hue angle in LCH color space which is at least 60° different from each of the other two of said first, second and third tinting colorants;
   said first tinting colorant having
      a first L value selected from a range between said first lower and said upper extreme L values, and
      a first C value selected from a range between 6 and 30 at said first lower extreme L value and selected from a range between 2 and 10 at said upper extreme L value, the range limits of first C values being proportional to those at said first lower and said upper extreme L values for first L values between said first lower and said upper extreme L values;

said second tinting colorant having
  a second L value selected from a range between said first lower and said upper extreme L values, and
  a second C value selected from a range between 6 and 42 at said first lower extreme L value and selected from a range between 2 and 14 at said upper extreme L value, the range of second C values being proportional to those at said first lower and said upper extreme L values for second L values between said first lower and said upper extreme L values; and said third tinting colorant having
  a third L value selected from a range between said second lower and said upper extreme L values, and
  a third C value selected from a range between 6 and 105 at said second lower extreme L value and between 2 and 40 at said upper extreme L value, the range of third C values being proportional to those at said second lower and said upper extreme L values for third L values between said second lower and said upper extreme L values.

2. The apparatus of claim 1 wherein:
when there are only said three tinting colorants, the greatest difference in L value between any of said three tinting colorants is not more than 50, unless said third tinting colorant does not have the highest L value of said three tinting colorants, in which case the greatest difference in L value between any of said three tinting colorants is not more than 30.

3. The apparatus of claim 1 wherein:
said first tinting colorant has a first hue angle selected from a range between 165° and 265°, said second tinting colorant has a second hue angle selected from a range between 285° and 25°, and
said third tinting colorant has a third hue angle selected from a range between 45° and 145°.

4. The apparatus of claim 1 further including:
a fourth black tinting colorant having
  a fourth L value selected from a range between 0 and 30, and
  a fourth C value selected from a range between 0 and 30.

5. The apparatus of claim 1 further including:
fourth, fifth, and sixth tinting colorants, having fourth, fifth and sixth L values, respectively,
  said first, second and third tinting colorants making a first set of tinting colorants,
  said fourth, fifth, and sixth tinting colorants making a second set of tinting colorants, and
  the difference between said first and fourth L values, between said second and fifth L values and between said third and sixth L values, respectively, being at least 20.

6. The apparatus of claim 5 further including:
a seventh black tinting colorant having
  a seventh L value selected from a range between 0 and 30, and
  a seventh C value selected from a range between 0 and 30.

7. The apparatus of claim 6 further including:
first and second average L values of said first and second sets of tinting colorants, respectively; and
said first and second average L values differing from one another by at least 30.

8. The apparatus of claim 1 further including:
a fourth black tinting colorant having
  a fourth L value selected from a range between 0 and 30,
  a fourth C value selected from a range between 0 and 50 when said fourth L value is 0 and selected from a range between 0 and 10 when said fourth L value is 30, and
  said fourth C value in no case being higher than the C value of any of said first, second or third tinting colorants when printed to any same L value as any of said first, second or third tinting colorants; and
a fifth gray colorant having
  a fifth L value selected from a range between 20 and 90, and
  a fifth C value for each said fifth L value, which said fifth C value is selected from a range between 0 and the lowest C value of any of said first, second or third tinting colorants printed to the same said L value as said fifth L value, including by printing at less than solid coverage or less than maximum density or both.

9. The apparatus of claim 1 further including:
a fourth black colorant having
  a fourth L value selected from a range between 0 and 30, and
  a fourth C value selected from a range between 0 and 30;
a fifth gray colorant having
  a fifth L value selected from a range between 20 and 90 and
  a fifth C value for each said fifth L value, which said fifth C value is selected from a range between 0 and the lowest C value of any of said first, second or third tinting colorants printed to the same said L value as said fifth L value, including by printing at less than solid coverage or less than maximum density or both; and
a sixth, gray colorant having
  a sixth L value selected from a range between 40 and 96, and
  a sixth C value for each said sixth L value, which said sixth C value is selected from a range between 0 and the lowest C value of any of said first, second or third tinting colorants printed to the same said L value as said sixth L value, including by printing at less than solid coverage or less than maximum density or both,
  wherein the sixth L value differs from the fifth L value by at least 20.

10. The apparatus of claim 1 wherein:
said tinting colorants are selected from the group comprising inks, dyes, thermal waxes, and pigments.

11. The apparatus of claim 10 further including:
a printing mechanism capable of printing from digital data, said printing mechanism selected from the group comprising printing presses, inkjet printers, dye sublimation printers, thermal wax transfer printers, laser ablation printers, off-press proofing systems, gelatin pigment transfer systems, and color toner laser printers.

12. A small-gamut colorant set apparatus for printing mechanisms that are capable of printing from digital data, including:
at least three tinting colorants having hue angles in LCH color space, namely,
  a first tinting colorant,
  a second tinting colorant, and
  a third tinting colorant;
a first lower extreme L value of 20;
a second lower extreme L value of 30;
an upper extreme L value of 100;

said first tinting colorant having
  a first hue angle selected from a range between 165° and 265°,
  a first L value selected from a range between said first lower and said upper extreme L values, and
  a first C value selected from a range between 6 and 20 at said first lower extreme L value and selected from a range between 2 and 7 at said upper extreme L value, the range limits of first C values being proportional to those at said first lower and said upper extreme L values for first L values between said first lower and said upper extreme L values;
said second tinting colorant having
  a second hue angle selected from a range between 285° and 25°,
  a second L value selected from a range between said first lower and said upper extreme L values, and
  a second C value selected from a range between 6 and 28 at said first lower extreme L value and selected from a range between 2 and 9 at said upper extreme L value, the range of second C values being proportional to those at said first lower and said upper extreme L values for second L values between said first lower and said upper extreme L values; and
said third tinting colorant having
  a third hue angle selected from a range between 45° and 145°,
  a third L value selected from a range between said second lower and said upper extreme L values, and
  a third C value selected from a range between 6 and 70 at said second lower extreme L value and between 2 and 27 at said upper extreme L value, the range of third C values being proportional to those at said second lower and said upper extreme L values for third L values between said second lower and said upper extreme L values.

13. The apparatus of claim 12 wherein:
when there are only said three tinting colorants, the greatest difference in L value between any of said three tinting colorants is not more than 50, unless said third tinting colorant does not have the highest L value of said three tinting colorants, in which case the greatest difference in L value between any of said three tinting colorants is not more than 30.

14. The apparatus of claim 12 wherein:
each of said first, second and third tinting colorants has a hue angle in said LCH color space which is at least 60° different from each of the other two of said first, second and third tinting colorants.

15. The apparatus of claim 14 further including:
a fourth black tinting colorant having
  a fourth L value selected from a range between 0 and 30, and
  a fourth C value selected from a range between 0 and 30.

16. The apparatus of claim 14 further including:
fourth, fifth, and sixth tinting colorants, having fourth, fifth and sixth L values, respectively,
  said first, second and third tinting colorants making a first set of tinting colorants,
  said fourth, fifth, and sixth tinting colorants making a second set of tinting colorants, and
  the difference between said first and fourth L values, between said second and fifth L values and between said third and sixth L values, respectively, being at least 20.

17. The apparatus of claim 16 further including:
a seventh black tinting colorant having
  a seventh L value selected from a range between 0 and 30, and
  a seventh C value selected from a range between 0 and 30.

18. The apparatus of claim 17 further including:
first and second average L values of said first and second sets of tinting colorants, respectively; and
said first and second average L values differing from one another by at least 30.

19. The apparatus of claim 12 further including:
a fourth black tinting colorant having
  a fourth L value selected from a range between 0 and 30,
  a fourth C value selected from a range between 0 and 50 when said fourth L value is 0 and selected from a range between 0 and 10 when said fourth L value is 30, and
  said fourth C value in no case being higher than the C value of any of said first, second or third tinting colorants when printed to any same L value as any of said first, second or third tinting colorants; and
a fifth gray colorant having
  a fifth L value selected from a range between 20 and 90, and
  a fifth C value for each said fifth L value, which said fifth C value is selected from a range between 0 and the lowest C value of any of said first, second or third tinting colorants printed to the same said L value as said fifth L value, including by printing at less than solid coverage or less than maximum density or both.

20. The apparatus of claim 12 further including:
a fourth black colorant having
  a fourth L value selected from a range between 0 and 30, and
  a fourth C value selected from a range between 0 and 30;
a fifth gray colorant having
  a fifth L value selected from a range between 20 and 90 and
  a fifth C value for each said fifth L value, which said fifth C value is selected from a range between 0 and the lowest C value of any of said first, second or third tinting colorants printed to the same said L value as said fifth L value, including by printing at less than solid coverage or less than maximum density or both; and
a sixth, gray colorant having
  a sixth L value selected from a range between 40 and 96, and
  a sixth C value for each said sixth L value, which said sixth C value is selected from a range between 0 and the lowest C value of any of said first, second or third tinting colorants printed to the same said L value as said sixth L value, including by printing at less than solid coverage or less than maximum density or both,
  wherein the sixth L value differs from the fifth L value by at least 20.

21. The apparatus of claim 12 wherein:
said tinting colorants are selected from the group comprising inks, dyes, thermal waxes, and pigments;
and further including
  a printing mechanism capable of printing from digital data, said printing mechanism selected from the group comprising printing presses, inkjet printers, dye sublimation printers, thermal wax transfer printers, laser ablation printers, off-press proofing systems, gelatin pigment transfer systems and color toner laser printers.

* * * * *